(12) United States Patent
Haataja

(10) Patent No.: US 10,690,874 B2
(45) Date of Patent: Jun. 23, 2020

(54) CABLE MANAGEMENT DEVICE

(71) Applicant: COMMSCOPE TECHNOLOGIES LLC, Hickory, NC (US)

(72) Inventor: Timothy Jon Haataja, Lakeville, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/324,191

(22) PCT Filed: Aug. 7, 2017

(86) PCT No.: PCT/US2017/045703
§ 371 (c)(1),
(2) Date: Feb. 8, 2019

(87) PCT Pub. No.: WO2018/031453
PCT Pub. Date: Feb. 15, 2018

(65) Prior Publication Data
US 2019/0170960 A1    Jun. 6, 2019

Related U.S. Application Data

(60) Provisional application No. 62/372,123, filed on Aug. 8, 2016.

(51) Int. Cl.
*G02B 6/44* (2006.01)
*H02G 3/04* (2006.01)
(Continued)

(52) U.S. Cl.
CPC ......... *G02B 6/4452* (2013.01); *G02B 6/4439* (2013.01); *G02B 6/4459* (2013.01);
(Continued)

(58) Field of Classification Search
None
See application file for complete search history.

(56) References Cited

U.S. PATENT DOCUMENTS 3,347,575 A   10/1967  Morris
6,266,250 B1* 7/2001  Foye .................... H02B 1/043
                                             211/41.17
(Continued)

FOREIGN PATENT DOCUMENTS

EP   2 669 532 A1   12/2013
GB   2 355 313 A     4/2001
(Continued)

OTHER PUBLICATIONS

International Search Report and Written Opinion of the International Searching Authority for International Patent Application No. PCT/US2017/045703 dated Oct. 31, 2017, 13 pages.
(Continued)

*Primary Examiner* — Tina M Wong
(74) *Attorney, Agent, or Firm* — Merchant & Gould P.C.

(57) ABSTRACT

A cable management device for mounting to a telecommunications fixture includes an outer barrel disposed over an inner barrel, one of the outer barrel and the inner barrel defining a plurality of discrete detents positioned in a stacked arrangement axially along an length thereof, and the other of the outer barrel and the inner barrel defining at least one flexible cantilever arm defining a tab configured to lock into a selected one of the detents for allowing adjustment of a length of the cable management device.

18 Claims, 8 Drawing Sheets

(51) Int. Cl.
*H02G 3/00* (2006.01)
*H02G 3/30* (2006.01)

(52) U.S. Cl.
CPC ............... *H02G 3/04* (2013.01); *H02G 3/263* (2013.01); *H02G 3/30* (2013.01)

(56) References Cited

U.S. PATENT DOCUMENTS

| | | | |
|---|---|---|---|
| 8,127,941 B2 | 3/2012 | Smith et al. | |
| 8,439,209 B2 * | 5/2013 | Strollo | A47B 81/00 211/75 |
| 2003/0111436 A1 | 6/2003 | Basinger et al. | |
| 2005/0051350 A1 * | 3/2005 | Porter | H02G 1/08 174/481 |
| 2006/0171651 A1 * | 8/2006 | Laursen | H04Q 1/064 385/135 |
| 2010/0193450 A1 * | 8/2010 | Bayazit | G02B 6/4452 211/26 |
| 2011/0192629 A1 | 8/2011 | Sculler et al. | |
| 2014/0060881 A1 * | 3/2014 | Rautenberg | H02B 13/045 174/69 |
| 2015/0362092 A1 | 12/2015 | Grandidge et al. | |
| 2017/0129424 A1 * | 5/2017 | Nagahashi | B60R 16/0215 |
| 2018/0166869 A1 * | 6/2018 | Bier | B26D 3/166 |
| 2019/0170960 A1 * | 6/2019 | Haataja | G02B 6/4452 |

FOREIGN PATENT DOCUMENTS

| | | |
|---|---|---|
| KR | 10-2002-0056504 A | 7/2002 |
| WO | 2013/124204 A1 | 8/2013 |

OTHER PUBLICATIONS

Extended European Search Report for corresponding European Patent Application No. 178400883 dated Feb. 10, 2020, 8 pages.

\* cited by examiner

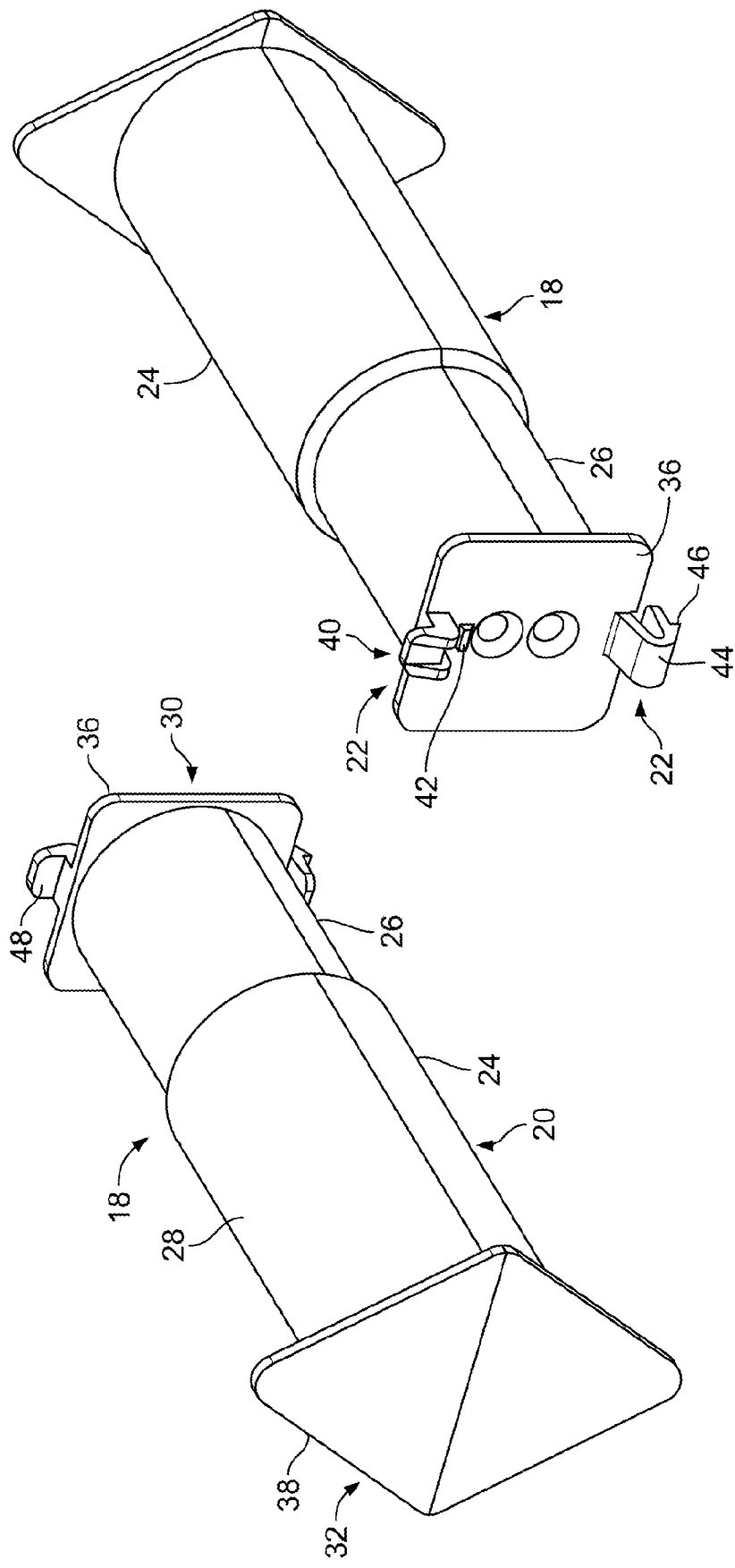

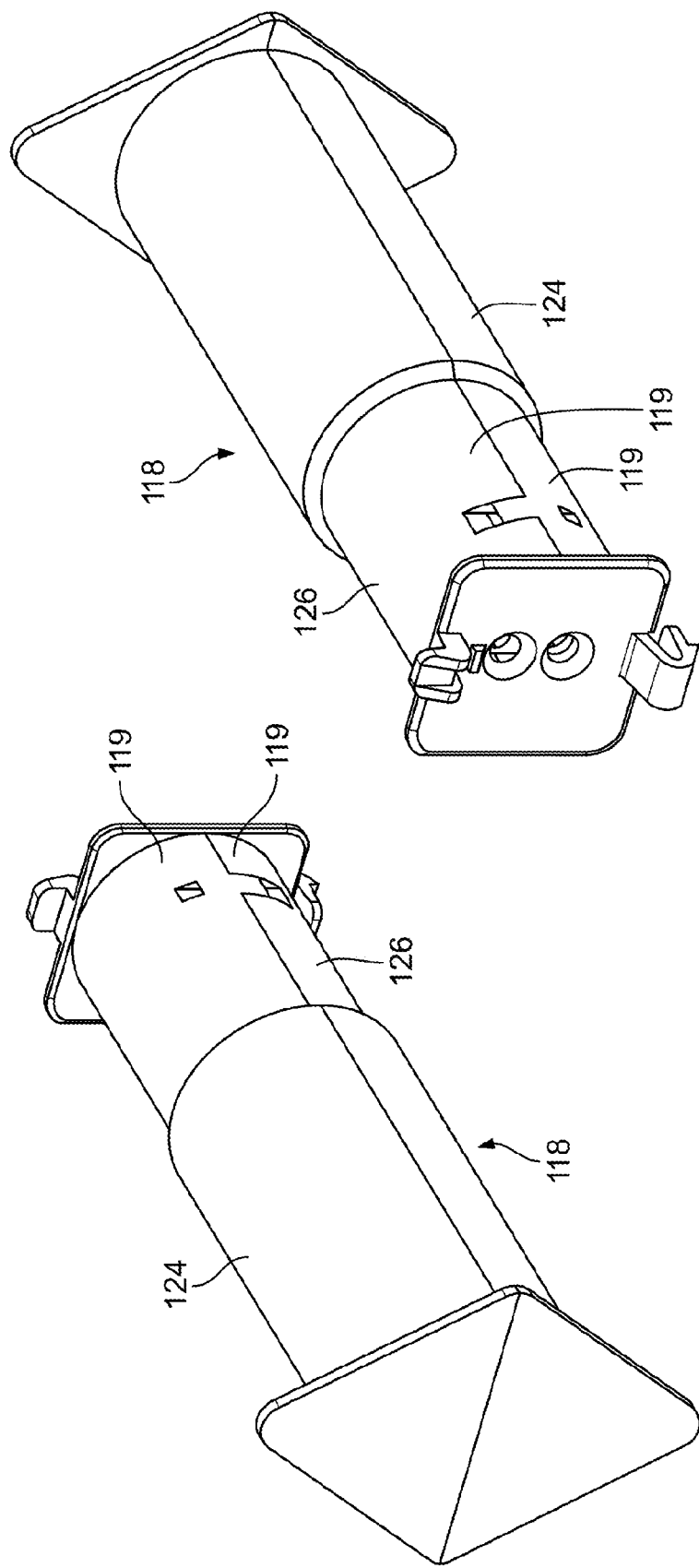

CABLE MANAGEMENT DEVICE

CROSS-REFERENCE TO RELATED APPLICATION

This application is a National Stage Application of PCT/US2017/045703, filed on Aug. 7, 2017, which claims the benefit of U.S. Patent Application Ser. No. 62/372,123, filed on Aug. 8, 2016, the disclosures of which are incorporated herein by reference in their entireties. To the extent appropriate, a claim of priority is made to each of the above disclosed applications.

TECHNICAL FIELD

The present disclosure relates generally to devices for enhancing cable management of a telecommunications system. More particularly, the present disclosure relates to a cable management assembly including a cable management spool used on a telecommunications panel.

BACKGROUND

Telecommunications systems commonly include cables (e.g., fiber optic cables, or copper twisted pair cables) for interconnecting pieces of telecommunications equipment. Telecommunications racks typically hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the space occupied by such cables. Cable management also involves routing cables in an orderly manner so as to reduce the likelihood of cable tangling. Ease of cable organization is also a factor related to effective cable management.

Cable management is also important in preventing damage to the cables. Unnecessary or excessive displacement of fiber optic cables, for example, is undesirable. As the fiber optic cables are displaced, they are subject to bending and other forces. Bending of the fibers can cause attenuation and loss of signal strength. As the fiber bends, the fiber can also break, resulting in a loss of transmission through the fiber.

According to one example type of cable management, cable spools may extend from a surface in columns, rows, or other configurations. One or more fiber optic cables may be hung over or wrapped around a curved surface of one or more of these spools to take up the slack length of the fiber optic cable.

In general, cable management improvement has been sought, generally to efficiently and effectively manage cables by providing system adaptability, and ease of cable organization, especially in such spool-based systems.

SUMMARY

One aspect of the present disclosure relates to a telecommunications system including a cable management assembly including a panel having a plurality of shaped apertures and a plurality of cable management devices in the form of spools for mounting to the panel. Each cable management device includes attachment features corresponding to the shaped apertures that secure the cable management devices to the panel at selected horizontal and vertical locations. According to one inventive aspect, the cable management devices in the form of spools may include features for adjusting or varying the axial lengths thereof for equipment clearance or space-adaptability.

According to another aspect, the disclosure relates to a cable management device in the form of a cable spool defining an outer barrel that is disposed over an inner barrel, both having a generally round configuration for providing cable management with bend radius protection. One of the outer barrel and the inner barrel includes a plurality of discretely spaced locking detents along the length thereof, and the other of the outer barrel and the inner barrel includes a flexible arm with a tab that can lock within one of the detents. Relative rotation between the outer barrel and the inner barrel allows the tab to enter or exit the detent. For example, after a desired length for the spool is determined, relative rotational movement between the outer barrel and the inner barrel allows the tab to lock within a detent that corresponds to the desired length, thus providing adjustability to the length of the overall cable management spool.

Another aspect of the present disclosure relates to a cable management assembly comprising a telecommunications panel including a plurality of shaped apertures arranged in an array of columns and rows and a plurality of cable management devices having attachment structures corresponding to the shaped apertures for removably mounting the cable management devices to the panel at selected vertical and horizontal locations, wherein each cable management device defines an outer barrel disposed over an inner barrel, one of the outer barrel and the inner barrel defining a plurality of discrete detents positioned in a stacked arrangement axially along a length thereof, and the other of the outer barrel and the inner barrel defining at least one flexible cantilever arm defining a tab configured to lock into a selected one of the detents for allowing adjustment of a length of the cable management device.

According to another aspect, the present disclosure relates to a cable management device for mounting to a telecommunications fixture, the cable management device comprising an outer barrel disposed over an inner barrel, one of the outer barrel and the inner barrel defining a plurality of discrete detents positioned in a stacked arrangement axially along a length thereof, and the other of the outer barrel and the inner barrel defining at least one flexible cantilever arm defining a tab configured to lock into a selected one of the detents for allowing adjustment of a length of the cable management device.

According to yet another aspect, the present disclosure relates to a method of using a cable management device, the method comprising adjusting a length of the cable management device by relatively sliding an outer barrel and an inner barrel of the cable management device to select the length of the cable management device and relatively rotating the outer barrel and the inner barrel and locking a tab of a flexible cantilever arm of one of the outer barrel and the inner barrel into a detent of a plurality of discrete detents positioned axially along a length of the other of the outer barrel and the inner barrel.

A variety of inventive aspects are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed inventions.

BRIEF DESCRIPTION OF THE DRAWINGS

FIG. 3 illustrates a perspective view of the cable management device of FIGS. 1-2 from a free end thereof;

FIG. 4 illustrates a perspective view of the cable management device of FIGS. 1-2 from a mounting end thereof;

FIG. 14 illustrates a perspective view of the cable management device of FIGS. 12-13 from a free end thereof; and FIG. 15 illustrates a perspective view of the cable management device of FIGS. 12-13 from a mounting end thereof.

DETAILED DESCRIPTION

Figure 2:
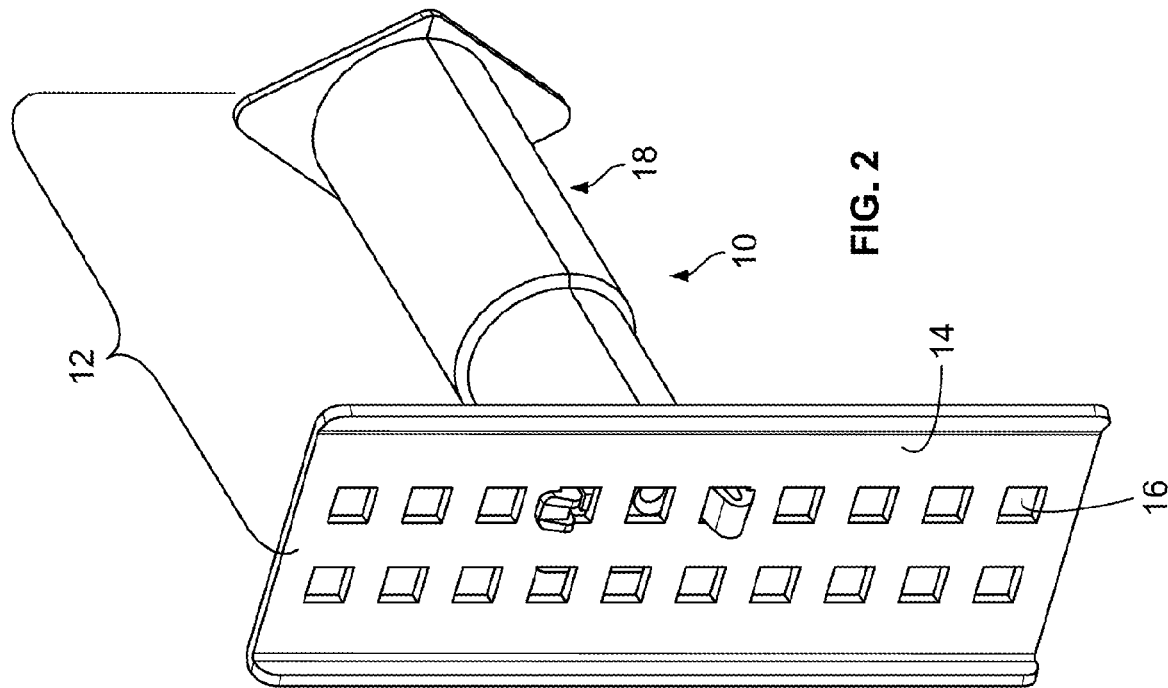
FIG. 2 illustrates the cable management assembly of FIG. 1 from an inner perspective view.
Figure 1:
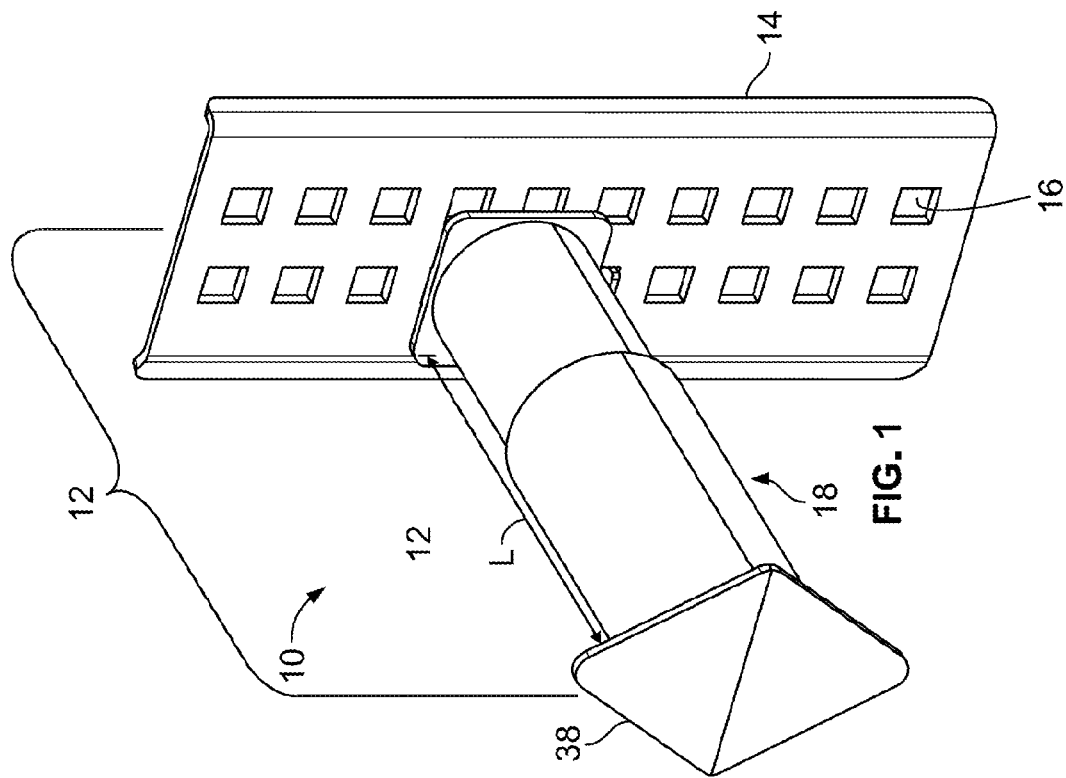
FIG. 1 illustrates a telecommunications system including a cable management assembly formed from a telecommunications panel and at least one cable management device having features that are examples of inventive aspects in accordance with the present disclosure removably mounted to the panel, the cable management assembly shown from an outer perspective view.
Figure 6:
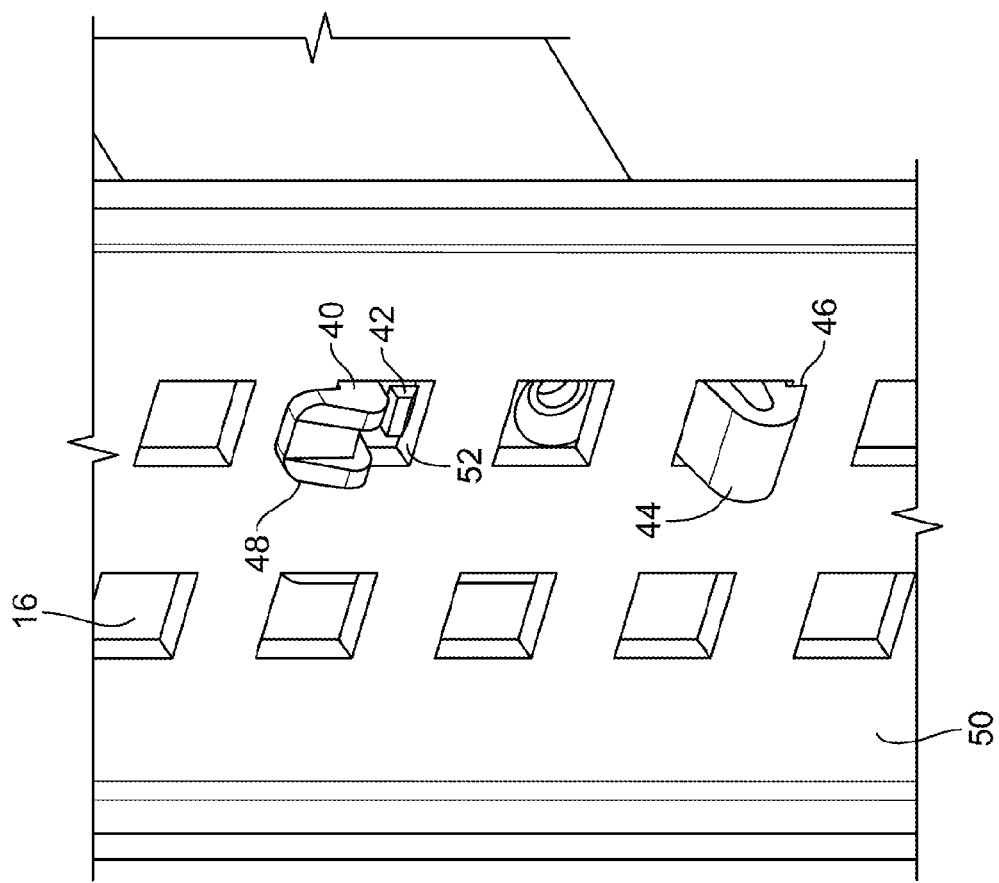
FIG. 6 illustrates a close-up view of the cable management device mounted to the panel of FIG. 2.
Figure 5:
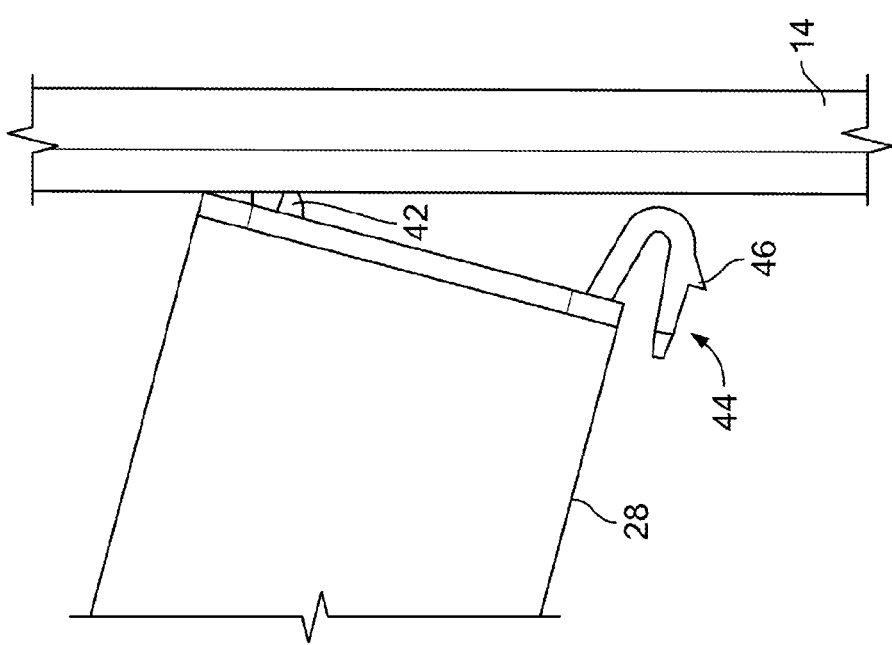
FIG. 5 illustrates the mounting of the cable management device of FIGS. 1-4 to the telecommunications panel shown in FIGS. 1-2.
Figure 8:
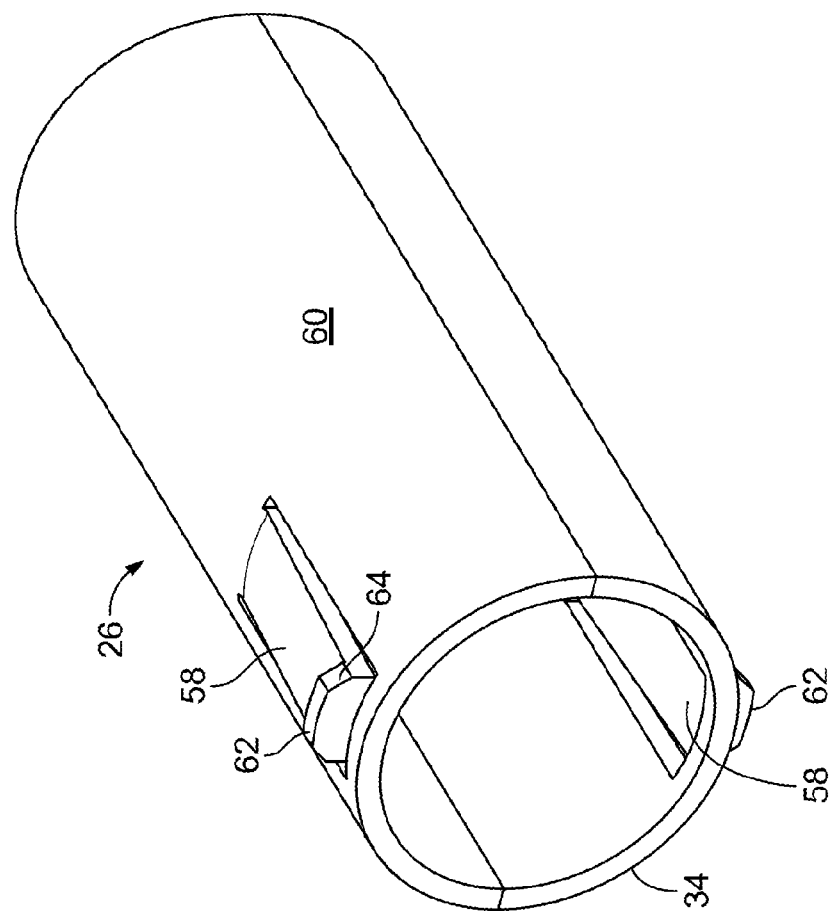
FIG. 8 illustrates a perspective view of an inner barrel of the cable management device of FIGS. 1-6.
Figure 7:
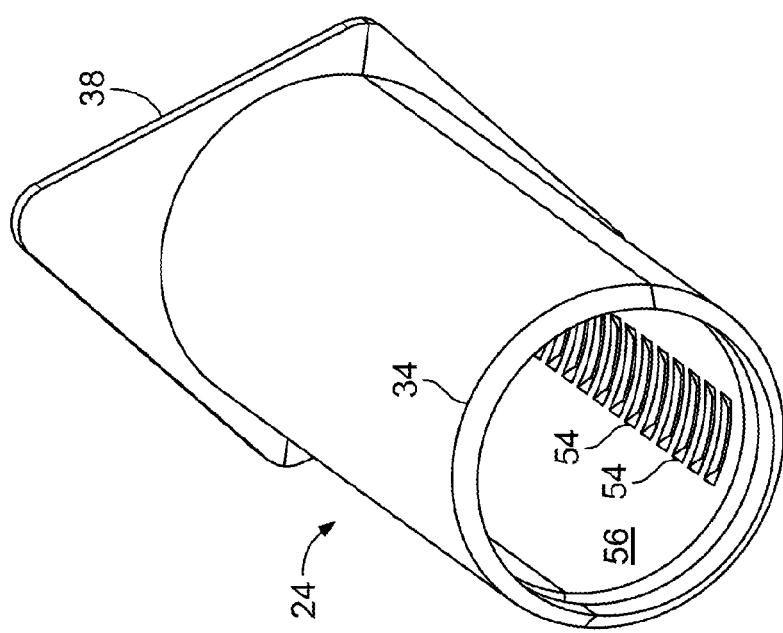
FIG. 7 illustrates a perspective view of an outer barrel of the cable management device of FIGS. 1-6.

Reference will now be made in detail to exemplary aspects of the present disclosure that are illustrated in the accompanying drawings. Wherever possible, the same reference numbers will be used throughout the drawings to refer to the same or like parts.

One embodiment of a telecommunications system 10 for managing cables interconnected to telecommunications components is illustrated in FIGS. 1-11. The telecommunication system 10 includes a cable management assembly 12 in accordance with the principles disclosed. The cable management assembly 12 is illustrated specifically in FIGS. 1, 2, 5, and 6 and includes a telecommunications panel 14 having a plurality of shaped apertures 16 and a plurality of cable management devices 18. In the depicted embodiment, the cable management devices 18 are provided in the form of spools 20. The panel 14 may also be referred to as a back plane or a riser.

Still referring to FIGS. 1-11, each cable management device 18 includes attachment features 22 corresponding to the shaped apertures 16 that secure the cable management devices 18 to the panel 14 at selected horizontal and vertical locations. The discrete apertures/openings 16 of the panel 14 and the cable management devices 18 are configured and sized so that a user can organize and arrange cables at various locations along the panel 14. As will be discussed in further detail, according to one inventive aspect, the cable management devices 18 may include features for adjusting or varying the axial lengths L thereof for equipment clearance or space-adaptability.

One feature of the present disclosure relates to cost reduction associated with fixed or custom-made cable management systems. The present cable management assembly 12 permits a user to configure the system 10 to a particular need. For example, in accordance with the principles disclosed herein, a user has the flexibility to position any number of the cable management devices 18 at a plurality of different locations on the panel 14 of the cable management assembly 12. In particular, the preferred panel 14 is constructed to provide a plurality of placement coordinates (i.e., vertical and horizontal locations) from which a user may choose to position the cable management devices 18. Thus, with this design, a user is not limited to a pre-made, fixed cable management system, which may not fit a particular need. Similarly, with this design, the user reduces or eliminates modification and customizing costs associated with reworking a system to fit the particular need.

Another feature of the present system 10 relates to the system's adaptability and ease of use. In one embodiment, the cable management devices 18 are detachably secured to the riser or panel 14. This feature permits a user to modify a system's cable management strategy to accommodate growth or changes needed in a quickly changing industry.

Still referring to FIGS. 1-11 in general, each cable management device 18 in the form of a spool 20 is configured to facilitate adding one or more fiber optic cables or optical fibers to a densely packed fiber storage region. The cable management device 18, in the given embodiment, is formed from an outer barrel 24 that is disposed over an inner barrel 26. The barrels 24, 26, cooperatively, define a storage surface 28 that extends between a first end 30 and a second end 32 of the spool 20.

In the example shown, both the outer barrel 24 and the inner barrel 26 forming the management device 18 define a circle-shaped lateral cross-dimensional profile 34.

At the first end 30 of the spool 20, attached to the inner barrel 26, is defined a latch plate 36. And, at the second end 32 of the spool 20, extending from the outer barrel 24, is defined a flange 38 for acting as a cable retainer to facilitate maintaining the fiber optic cables on the storage surface 28.

At the first end 30 of the spool 20, the latch plate 36 includes features 22 for latching the spool 20 to a piece of telecommunications equipment such as the panel 14 shown in FIGS. 1, 2, 5, and 6. The latch plate 36 includes a catch 40, an abutment member 42 at an upper portion thereof, and a snap-in latch member 44 at a lower portion thereof. The latch member 44 defines a latch tab 46.

The upper and the lower features 22 of the latch plate 36 are configured to cooperate with corresponding shaped apertures 16 on the panel 14 for mounting the spools 20 to desired positions on the panel 14 as discussed previously. In general, the cable management device 18 is designed to be secured to the panel 14 by insertion into the panel 14 from one side, without the use of tools or extra fastening components. As shown in detail in FIGS. 5-6, in mounting a spool 20 to a panel 14, the upper catch 40 is first inserted through an aperture 16 in the panel 14. Once a retention portion 48 of the catch 40 is hooked against the panel 14, the latch plate 36, and thus the entire spool 20, is pivoted down to insert the latch member 44 through another lower aperture 16 that is spaced apart from the upper aperture 16 of the panel 14 along the same column. The latch member 44 is flexibly inserted until the latch tab 46 clears the panel wall 50 and the spool 20 is latched into place. The abutment member 42 at the upper portion of the latch plate 36 is configured to contact a portion of the panel wall 50 defining a lower edge 52 of the upper aperture 16 and provide further stability to the latched spool 20.

In releasing the spool 20 from the panel 14 and disassembling the cable management assembly 12, the portion of the latch member 44 defining the latch tab 46 is simply flexed upwardly until the tab 46 clears the aperture 16 and the spool 20 is pivoted away from the panel 14. A final downward movement of the spool 20 in unhooking the upper catch 40 releases the spool 20 from the panel 14.

Now referring to FIGS. 7-11 specifically, as discussed above and as will be discussed in further detail below, the outer barrel 24 and the inner barrel 26 include features that provide adjustability of the length L of the overall spool 20. Allowing adjustability of the length L of the spool 20 facilitates clearance for other equipment that may be positioned adjacent the panel 14.

In the example shown, the outer barrel 24 defines a plurality of discretely positioned detents 54 at the inner surface 56 thereof extending axially along the outer barrel 24. It should be noted that two sets of detents 54 may be positioned at the inner surface 56, on opposing sides thereof.

In the example shown, the inner barrel 26 defines a flexible cantilever arm 58 on opposing sides of the outer surface 60 thereof. The flexible cantilever arms 58 define tabs 62 that are configured to project radially outwardly from the outer surface 60 of the inner barrel 26. As will be discussed, the tabs 62 are configured to mate with and lock into the detents 54 provided on the inner surface 56 of the outer barrel 24 in positionally locking the outer barrel 24 to the inner barrel 26. When the tabs 62 are not within the detents 54, the outer barrel 24 can be slidably moved in a telescoping fashion with respect to the inner barrel 26 in adjusting the length L of the spool 20. And, once the desired length L is set and the tabs 62 are in alignment with the detents 54 that correspond to the selected length L of the spool 20, relative rotation of the outer barrel 24 over the inner barrel 26 moves the tabs 62 into the detents 54 to lock the outer barrel 24 with respect to the inner barrel 26.

If further adjustment is needed, relative rotation between the outer barrel 24 and the inner barrel 26 once again allows a tab 62 or a pair of tabs 62 to exit a detent 54 or a pair of detents 54. After a desired length L for the spool 20 is determined, relative rotational movement between the outer barrel 24 and the inner barrel 26 once again allows the tab 62 to lock within another of the detents 54 that corresponds to the desired length L. Thus, the telescoping slidable movement and the rotational locking movement between the outer and inner barrels 24, 26 provide adjustability to the length L of the overall cable management spool 20.

Figure 10:
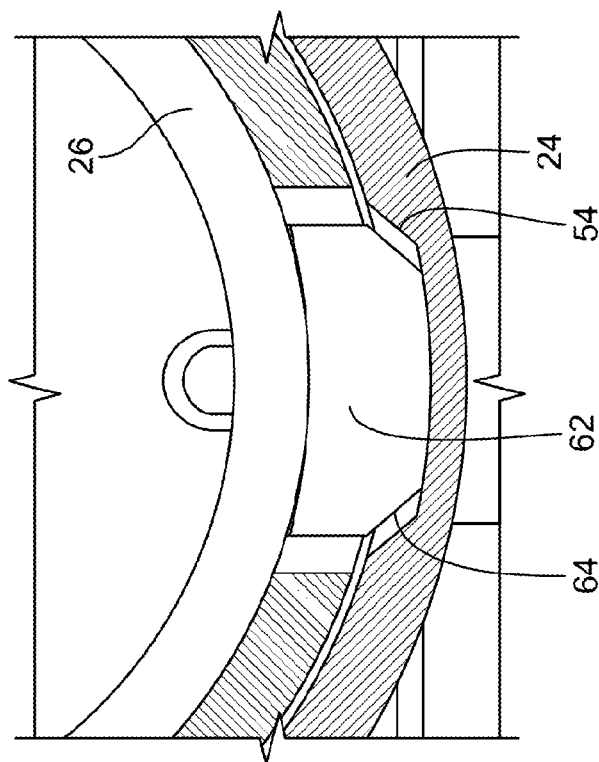
FIG. 10 is a partial lateral cross-sectional view of the cable management device of FIGS. 1-6 showing the outer and inner barrels thereof in a locked position.
Figure 9:
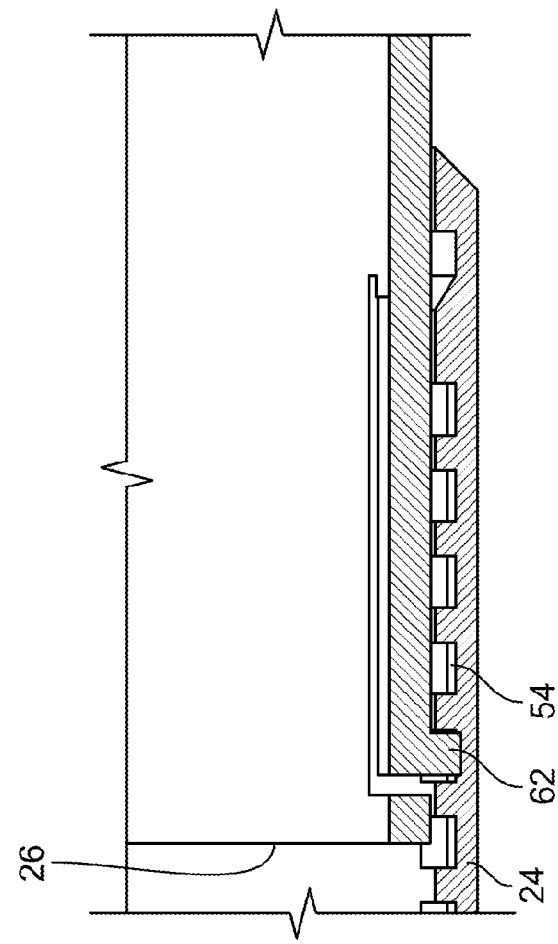
FIG. 9 is a partial cross-sectional view bisecting the cable management device of FIGS. 1-6 showing the outer and inner barrels thereof in a locked position.
Figure 11:
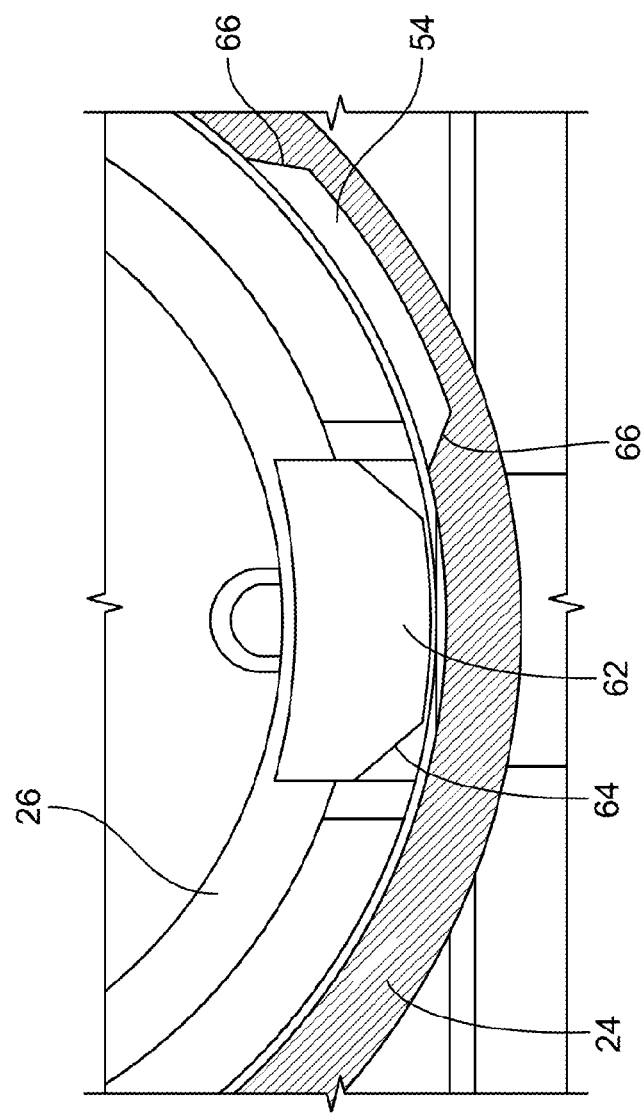
FIG. 11 is a partial cross-sectional view similar to that of FIG. 10, showing the outer and inner barrels thereof in an unlocked position.
Figure 13:
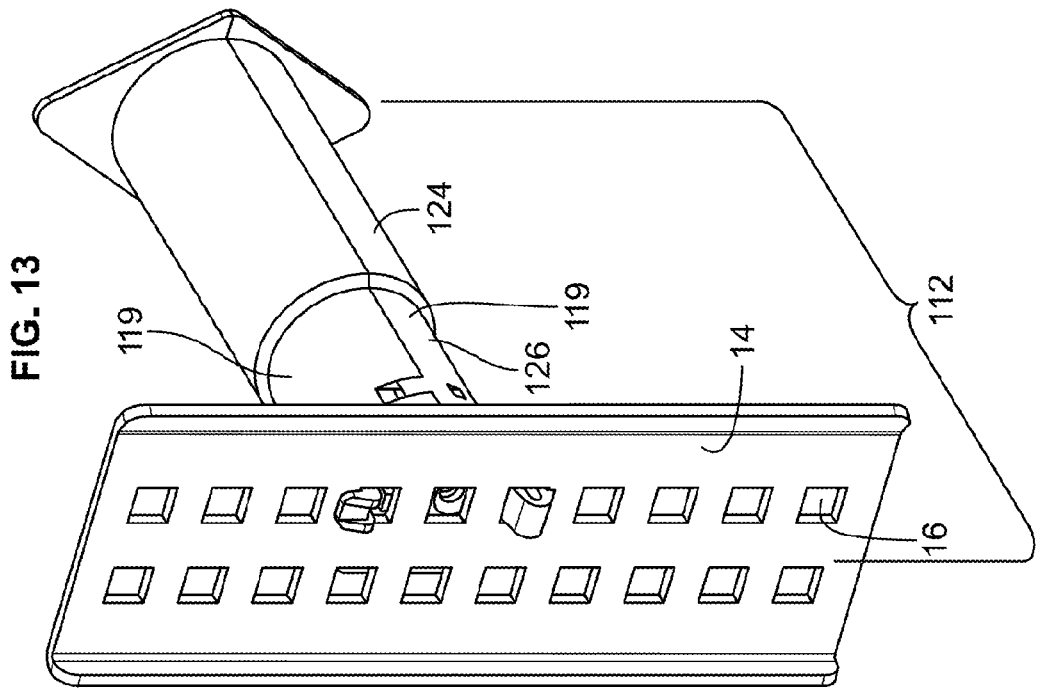
FIG. 13 illustrates the cable management assembly of FIG. 12 from an inner perspective view.
Figure 12:
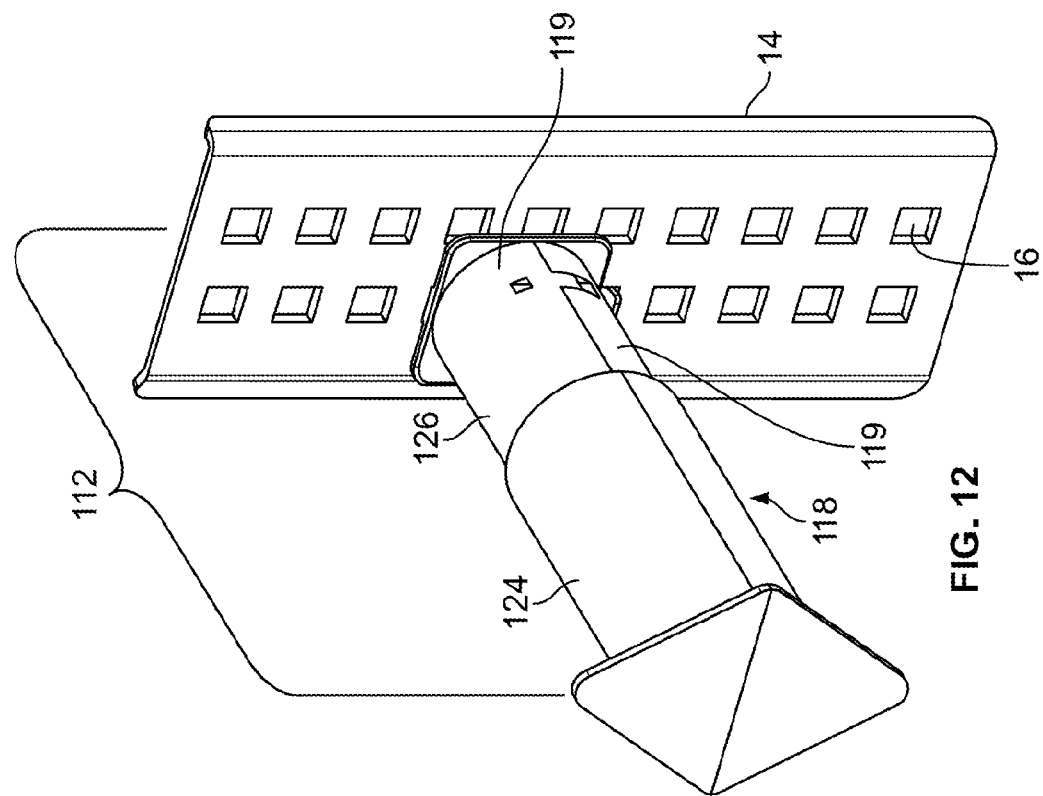
FIG. 12 illustrates another embodiment of a telecommunications system including a cable management assembly formed from a telecommunications panel and a second example of a cable management device having features that are examples of inventive aspects in accordance with the present disclosure removably mounted to the panel, the cable management assembly shown from an outer perspective view.

FIGS. 9-10 illustrate a locked position for the spool 20 with one of the tabs 62 of the flexible cantilever arms 58 within one of the detents 54. FIG. 11 illustrates an unlocked position for the spool 20, wherein a tab 62 or a pair of tabs 62 are outside of a given detent 54 or pair of detents 54. In the unlocked position shown in FIG. 11, the outer barrel 24 is able to telescopically slide with respect to the inner barrel 26 so as to provide adjustment for the length L of the spool 20.

It should be noted that the tabs 62 on the flexible cantilever arms 58 may include tapered surfaces 64 to help with slidable insertion into and removal from the detents 54. As shown in the cross-sectional views in FIGS. 10 and 11, the detents 54 may also define tapered entry/exit surfaces 66 to facilitate insertion and removal of the tabs 62.

It will be appreciated that, even though in the depicted embodiment, the outer barrel 124 is the structure that is configured with the detents 54 and the inner barrel 26 is the structure that is configured with the cooperating cantilever arms 58, in other embodiments, these structures may be reversed.

FIGS. 12-15 illustrate a cable management assembly 112 including a panel 14 and a cable management device 118 that has features similar to those described above with respect to the device 18 of FIGS. 1-11. In the device 118 of FIGS. 12-15, both the outer and the inner barrels 124, 126 of the device 118 are depicted as having been molded from two semi-circular pieces 119 that are fitted together with a snap-fit interlock to form the circular lateral cross-dimensional profile 34. In the embodiment of the spool 20 illustrated in FIGS. 1-11, the outer and the inner barrels 24, 26 are illustrated as structures that are molded as a single piece. Otherwise, the devices 18, 118 of FIGS. 1-11 and 12-15 function in a similar manner.

The above specification provides a complete description of the telecommunications systems including the cable management assemblies and methods of use. Since many embodiments of the disclosure can be made without departing from the spirit and scope of the inventive aspects, the inventive aspects reside in the claims hereinafter appended.

What is claimed is:

1. A cable management assembly comprising:
 a telecommunications panel including a plurality of shaped apertures arranged in an array of columns and rows; and
 a plurality of cable management devices having attachment structures corresponding to the shaped apertures for removably mounting the cable management devices to the panel at selected vertical and horizontal locations, wherein each cable management device defines an outer barrel disposed over an inner barrel, one of the outer barrel and the inner barrel defining a plurality of discrete detents positioned in a stacked arrangement axially along a length thereof, and the other of the outer barrel and the inner barrel defining at least one flexible cantilever arm defining a tab configured to lock into a selected one of the detents for allowing adjustment of a length of the cable management device, wherein the outer barrel and the inner barrel are rotatable relative to each other for disengaging or engaging the tab from the detent for adjusting the length of the cable management device.

2. The cable management assembly of claim 1, wherein the outer barrel and the inner barrel are slidable with respect to each other when the tab is out of the detent for adjusting the length of the cable management device.

3. The cable management assembly of claim 1, wherein both the outer barrel and the inner barrel define circular lateral cross-dimensional profiles.

4. The cable management assembly of claim 1, wherein the tab projects either radially outward past an outer surface of the inner barrel or radially inward past an inner surface of the outer barrel.

5. The cable management assembly of claim 1, wherein one of the outer barrel and the inner barrel defines two opposing sets of discrete detents positioned axially along a length thereof, and the other of the outer barrel and the inner barrel defines two flexible cantilever arms with tabs on opposing sides thereof that are configured to lock into a selected detent set for allowing adjustment of the length of the cable management device.

6. The cable management assembly of claim 1, wherein one of the outer barrel and the inner barrel includes a cable retention flange at an end of the cable management device.

7. The cable management assembly of claim 1, wherein the attachment structures are defined by a catch for hooking through a first aperture of the panel and a flexible latch configured to flex through and lock into a second aperture of the panel after a pivotal motion of the cable management device relative to the panel.

8. A cable management device for mounting to a telecommunications fixture, the cable management device comprising:
an outer barrel disposed over an inner barrel, one of the outer barrel and the inner barrel defining a plurality of discrete detents positioned in a stacked arrangement axially along a length thereof, and the other of the outer barrel and the inner barrel defining at least one flexible cantilever arm defining a tab configured to lock into a selected one of the detents for allowing adjustment of a length of the cable management device, wherein the outer barrel and the inner barrel are rotatable relative to each other for disengaging or engaging the tab from the detent for adjusting the length of the cable management device.

9. The cable management assembly of claim 8, wherein the outer barrel and the inner barrel are slidable with respect to each other when the tab is out of the detent for adjusting the length of the cable management device.

10. The cable management device of claim 8, wherein both the outer barrel and the inner barrel define circular lateral cross-dimensional profiles.

11. The cable management device of claim 8, wherein the tab projects either radially outward past an outer surface of the inner barrel or radially inward past an inner surface of the outer barrel.

12. The cable management device of claim 8, wherein one of the outer barrel and the inner barrel defines two opposing sets of discrete detents positioned axially along an length thereof, and the other of the outer barrel and the inner barrel defines two flexible cantilever arms with tabs on opposing sides thereof that are configured to lock into a selected detent set for allowing adjustment of the length of the cable management device.

13. The cable management device of claim 8, wherein one of the outer barrel and the inner barrel includes a cable retention flange at an end of the cable management device.

14. A method of using a cable management device, the method comprising:
adjusting a length of the cable management device by relatively sliding an outer barrel and an inner barrel of the cable management device to select the length of the cable management device; and
relatively rotating the outer barrel and the inner barrel and locking a tab of a flexible cantilever arm of one of the outer barrel and the inner barrel into a detent of a plurality of discrete detents positioned axially along a length of the other of the outer barrel and the inner barrel.

15. The method of claim 14, wherein one of the outer barrel and the inner barrel defines two opposing sets of discrete detents positioned axially along the length thereof, and the other of the outer barrel and the inner barrel defines two flexible cantilever arms with tabs on opposing sides thereof that are configured to lock into a selected detent set for allowing adjustment of the length of the cable management device.

16. The method of claim 14, further comprising:
relatively rotating the outer barrel and the inner barrel to remove the locked tab of the flexible cantilever arm of one of the outer barrel and the inner barrel from the detent of the other of the outer barrel and the inner barrel;
relatively sliding the outer barrel and the inner barrel of the cable management device to select the length of the cable management device; and
relatively rotating the outer barrel and the inner barrel and locking the tab of the flexible cantilever arm of one of the outer barrel and the inner barrel into another detent of the plurality of discrete detents positioned axially along the length of the other of the outer barrel and the inner barrel.

17. The method of claim 14, further comprising mounting the cable management device to a telecommunications panel with a snap-fit interlock.

18. The method of claim 17, further comprising mounting the cable management device to the telecommunications panel before adjusting the length of the cable management device.

* * * * *